UNITED STATES PATENT OFFICE.

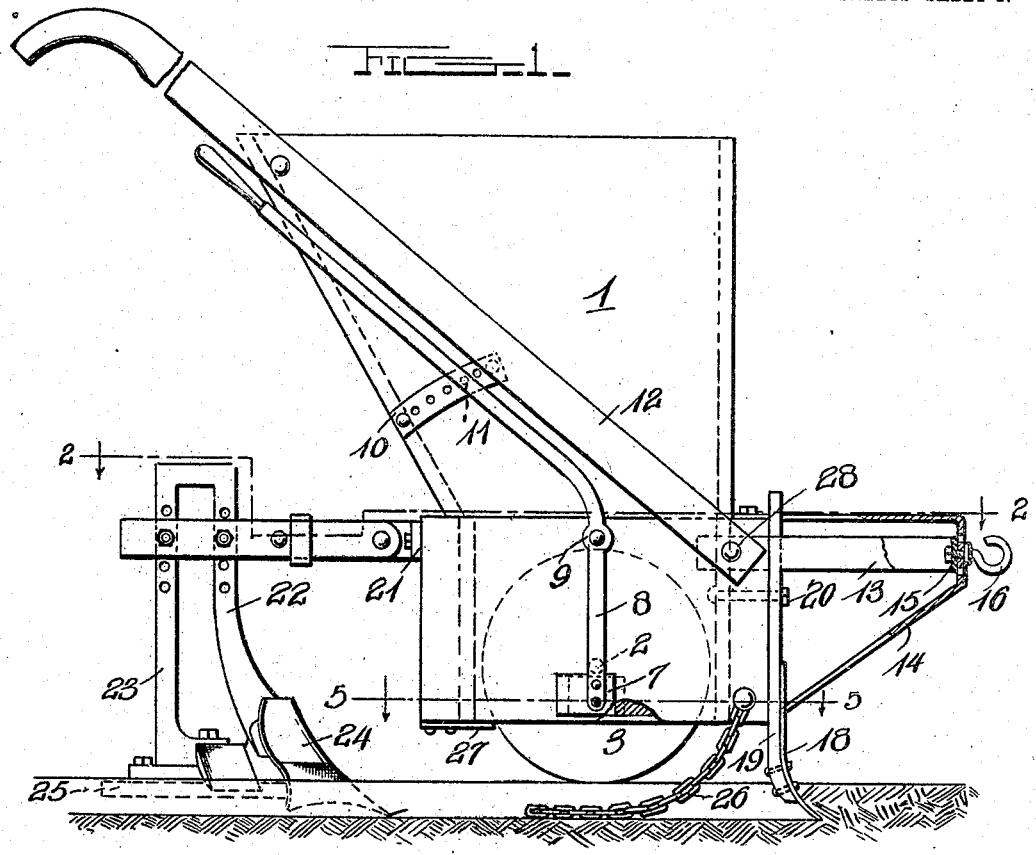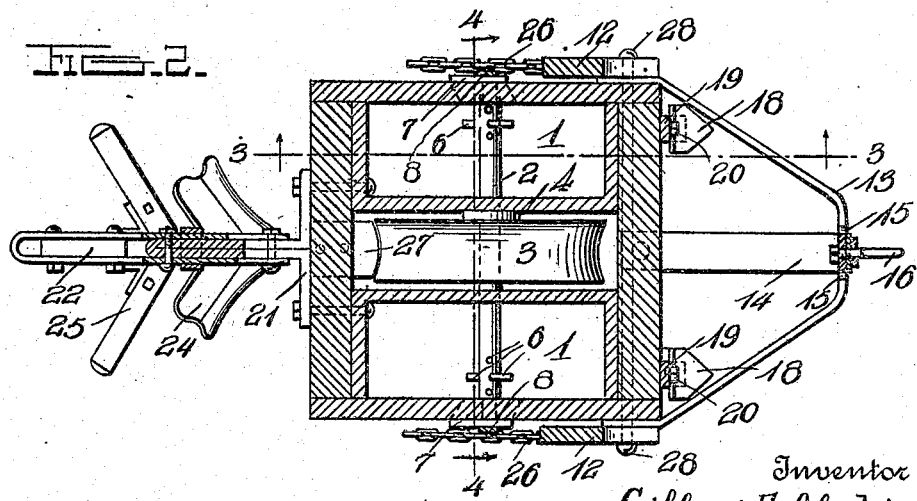

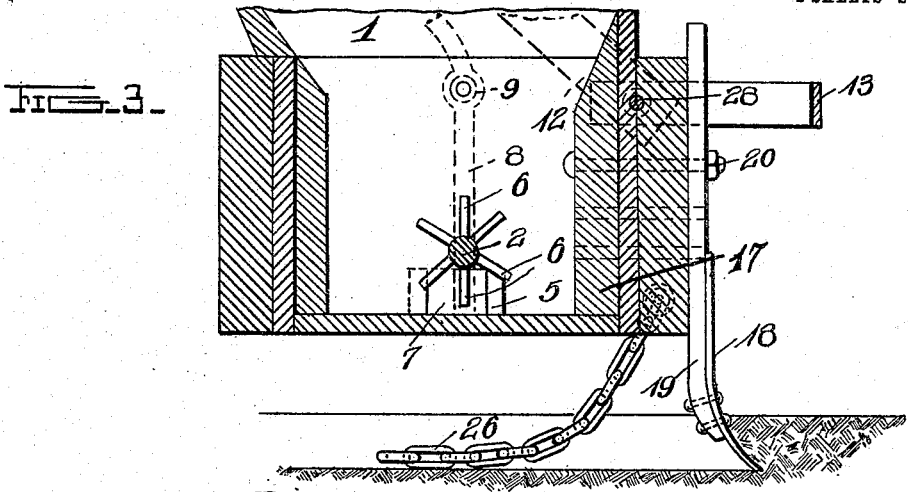
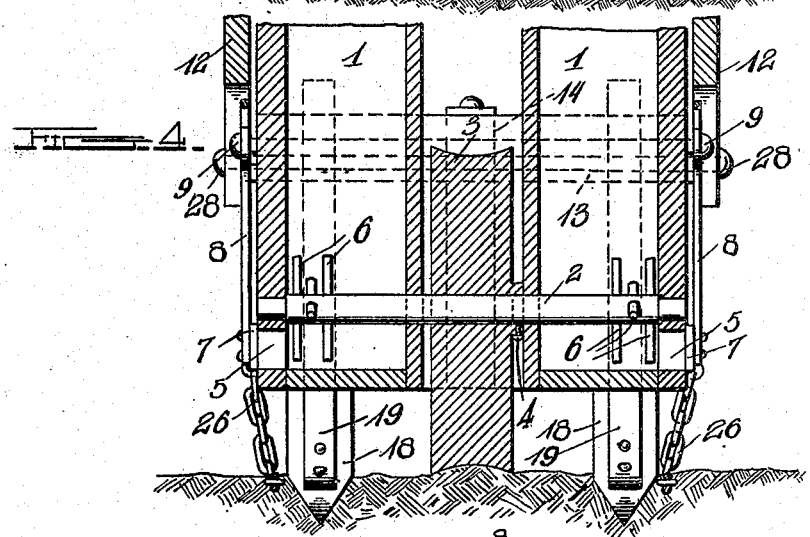
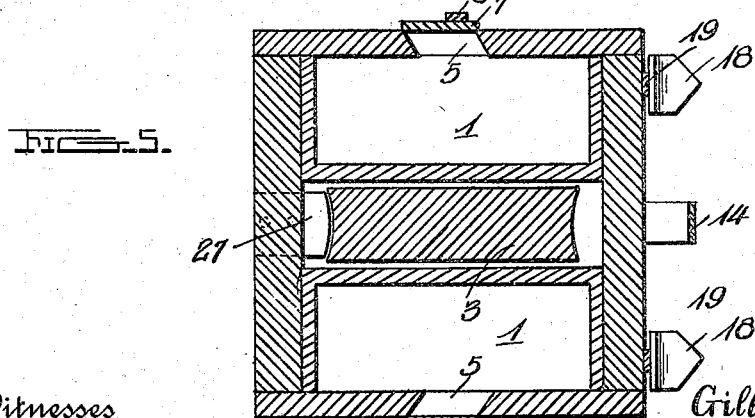

GILBERT E. ALPHIN, OF MOUNT OLIVE, NORTH CAROLINA.

FERTILIZER-DISTRIBUTER.

941,603.   Specification of Letters Patent.   Patented Nov. 30, 1909.

Application filed July 22, 1909. Serial No. 509,036.

*To all whom it may concern:*

Be it known that I, GILBERT E. ALPHIN, a citizen of the United States, residing at Mount Olive, in the county of Wayne and State of North Carolina, have invented certain new and useful Improvements in Fertilizer-Distributers; and I do declare the following to be a full, clear, and exact description of the invention, such as will enable others skilled in the art to which it appertains to make and use the same.

This invention relates to improvements in fertilizer distributers.

One object of the invention is to provide a fertilizer distributer having an improved construction of feeding and discharging mechanism whereby fertilizer is discharged from both sides of the machine along the adjacent sides of the rows of plants, between which the distributer is moved.

Another object is to provide means whereby the fertilizer thus distributed is covered and the rows of plants cultivated simultaneously with the fertilizing operation.

With the foregoing and other objects in view, the invention consists of certain novel features of construction, combination and arrangement of parts, as will be more fully described and particularly pointed out in the appended claim.

In the accompanying drawings, Figure 1 is a side view, partly in section of one side of my improved fertilizer distributer; Fig. 2 is a horizontal section on the line 2—2 of Fig. 1; Fig. 3 is a vertical longitudinal section on the line 3—3 of Fig. 2; Fig. 4 is a vertical cross sectional view on a line with the agitator and hopper supporting shaft; Fig. 5 is a detail horizonal section on the line 5—5 of Fig. 1.

Referring more particularly to the drawings, 1 denotes the hoppers of my improved fertilizer distributer, said hoppers being spaced apart and supported upon an axle or shaft 2 on which, between the hoppers, is loosely mounted, a supporting wheel 3, said wheel being locked into engagement with the shaft to turn the latter by a set screw 4. In the outer side of each of the hoppers or immediately below the shaft 2 is formed fertilizer discharging apertures 5, said apertures being preferably formed at an oblique angle and opening toward the rear end of the machine, as shown. On the shaft 2 within each of the hoppers 1, are arranged agitating fingers 6, said fingers being arranged spirally around the shaft, as shown whereby when the shaft is operated the fingers will tend to force the fertilizer outwardly through the passages 5.

On the outer sides of the hoppers are arranged cover plates 7 which are adapted to open and close the fertilizer discharging apertures 5 and said plates 7 are secured to the lower end of operating levers 8 which are pivotally mounted on the outer sides of the hoppers, as shown at 9. The upper portions of the levers 8 are bent or curved rearwardly and project a suitable distance beyond the rear sides of the hoppers whereby the levers may be readily grasped and operated to move the plates back and forth to open or close the fertilizer distributing passages 5. On the outer sides of the hoppers are secured segmental shaped spring locking plates 10 in which are formed series of locking apertures with which are adapted to be engaged a pin or stud 11 secured to the inner sides of the levers whereby the latter are held in their adjusted positions to support the plates 7 in an open or closed position.

To the outer sides of the hoppers are secured handles 12, below which the rearwardly bent ends of the levers 8 are disposed. Secured to the front end of the hoppers are horizontally and vertically disposed draft frames 13 and 14, in the front portions of which are formed a series of apertures 15 with which a draft hook 16 is engaged, said apertures permitting the draft hook to be adjusted horizontally to regulate the draft of the distributer. In the lower portion of each end of the hoppers are arranged guide blocks 17, the upper ends of which are beveled or inclined, as shown, whereby the fertilizer in the hoppers is directed toward the center of the same and beneath the agitating fingers. On the front end of the hoppers, adjacent to each outer corner thereof are secured furrow opening blades or shovels 18, the standards 19 of which are provided with a series of apertures to receive a fastening bolt 20 which is arranged through the guide blocks in the forward end of the hoppers, whereby the shovel 18 is adjustably connected to the hoppers.

Secured to the rear side of the hopper is a bracket 21 in which is adjustably secured the upper end of a plow standard 22 and a sweep standard 23, on the lower end of which are detachably secured a plow shovel 24 and a sweep 25. To the opposite outer sides of the hoppers 1, adjacent to their forward lower corners are secured fertilizer covering chains 26 by means of which the fertilizer dropped into the furrows which are opened alongside the rows of plants by the blades or shovels 18, is covered. On the underside of the hoppers, adjacent to the rear side of the wheel 3, is arranged a scraper 27 by means of which the surface of the wheel is kept clean. The periphery or surface of the wheel 3 is preferably concave and the scraper 27 is constructed to fit the same. The hopper and other parts of the machine are securely braced and held in operative position by means of tie rods or bolts 28 arranged through the hoppers, as shown.

In the operation of the machine, as the same is drawn along between the rows of plants, the shovels 18 open a furrow along the rows and fertilizer is discharged through the passages 5 into the furrows thus opened, the quantity of fertilizer discharged being regulated by the cover plates 7 which is operated by the lever 8, as hereinbefore described. After the fertilizer has thus been discharged in the furrows, it is covered by the covering chains 26 which drag along the ground over the furrows. Simultaneously with the fertilizing operation, the rows of plants are cultivated by means of the plow 24 and the sweep 25 which are arranged on the rear ends of the hoppers, as shown. When it is desired to move the machine without operating the fertilizer agitating and feeding fingers, the set screw 4 is loosened to permit the supporting wheel 3 to revolve loosely on the shaft 2, so that the latter and the agitating fingers thereon will not be rotated by the wheel.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:

In a fertilizer distributer, a pair of hoppers having formed in their side walls rearwardly opening passages laterally movable, cover plates operable to open and close said passages, operating levers connected to said plates, said levers having curved rearwardly projecting upper ends, spring locking plates secured to the outer sides of the hoppers, said plates having formed therein a series of locking apertures, a stud arranged on each of said levers and adapted to be engaged with the apertures in said locking plates whereby said levers are held in their adjusted positions to hold the cover plates opened or closed, a supporting shaft revolubly mounted on said hoppers, a supporting wheel loosely mounted on said shaft, a set screw to secure said wheel to the shaft, a series of spirally disposed agitating fingers arranged on said shaft in said hoppers whereby the fertilizer is fed through the discharge passages therein, furrow openers secured to said hoppers and adapted to open furrows to receive the fertilizer discharged through the hoppers, chains secured to the hoppers and adapted to drag over the ground and cover the fertilizer discharged in said furrows, and a cultivating plow arranged at the rear end of the distributer.

In testimony whereof I have hereunto set my hand in presence of two subscribing witnesses.

GILBERT E. ALPHIN.

Witnesses:
  E. N. REIKS,
  D. K. KORNEGAY.